United States Patent
Padilla (10) Patent No.: US 9,764,853 B2
(45) Date of Patent: Sep. 19, 2017

(54) MOTIONLESS FLIGHT CONTROL SURFACE SKEW DETECTION SYSTEM

(71) Applicant: The Boeing Company, Chicago, IL (US)

(72) Inventor: Peter A. Padilla, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 258 days.

(21) Appl. No.: 14/675,845

(22) Filed: Apr. 1, 2015

(65) Prior Publication Data

US 2016/0288921 A1    Oct. 6, 2016

(51) Int. Cl.
| | | |
|---|---|---|
| *B64D 9/00* | (2006.01) | |
| *B64D 45/00* | (2006.01) | |
| *B64C 9/00* | (2006.01) | |
| *B64C 9/02* | (2006.01) | |
| *B64C 13/00* | (2006.01) | |
| *B64C 9/16* | (2006.01) | |
| *B64C 9/22* | (2006.01) | |
| *G05D 1/00* | (2006.01) | |

(52) U.S. Cl.
CPC ............ *B64D 45/0005* (2013.01); *B64C 9/00* (2013.01); *B64C 9/02* (2013.01); *B64C 13/00* (2013.01); *B64C 9/16* (2013.01); *B64C 9/22* (2013.01); *B64D 2045/001* (2013.01); *G05D 1/0055* (2013.01)

(58) Field of Classification Search
CPC .... B64C 9/00; B64C 9/02; B64C 9/22; B64C 9/16
See application file for complete search history.

(56) References Cited

U.S. PATENT DOCUMENTS

| | | | | |
|---|---|---|---|---|
| 2,969,933 A | * | 1/1961 | Vogt ....................... | B64C 37/02 244/2 |
| 7,945,425 B2 | | 5/2011 | Marx et al. | |

(Continued)

FOREIGN PATENT DOCUMENTS

| | | |
|---|---|---|
| CA | 2841729 | 9/2014 |
| EP | 0922633 | 6/1999 |

(Continued)

OTHER PUBLICATIONS

EP, Extended European Search Report; Patent Application No. 16157008.0 (Aug. 31, 2016).

*Primary Examiner* — Justin Benedik
(74) *Attorney, Agent, or Firm* — Thompson Hine LLP (57) ABSTRACT

A motionless skew detection system for an aircraft is disclosed, and includes a flight control surface of an aircraft wing, two drive mechanisms for operating the flight control surface, a first load sensor and a second load sensor for each of the two drive mechanisms, and a control module. Each of the two drive mechanisms are located on opposing sides of the flight control surface and each of the two drive mechanisms include at least a first linkage including a first outer surface and a second linkage including a second outer surface. The first load sensor is disposed along the first outer surface of the first linkage and the second load sensor is disposed along the second outer surface of the second linkage. The control module is in signal communication with the first load sensor and the second load sensor of each drive mechanism.

20 Claims, 6 Drawing Sheets

(56) References Cited

U.S. PATENT DOCUMENTS

| | | |
|---|---|---|
| 8,115,649 B2 | 2/2012 | Moy et al. |
| 2011/0255968 A1* | 10/2011 | Recksiek ............ B64D 45/0005 416/23 |
| 2012/0312931 A1 | 12/2012 | Recksiek et al. |
| 2013/0181089 A1 | 7/2013 | Recksiek et al. |

FOREIGN PATENT DOCUMENTS

| | | |
|---|---|---|
| EP | 2322431 | 5/2011 |
| EP | 2392510 | 12/2011 |
| WO | 2011/124904 | 10/2011 |
| WO | 2012/031759 | 3/2012 |

* cited by examiner

MOTIONLESS FLIGHT CONTROL SURFACE SKEW DETECTION SYSTEM

FIELD

The disclosed system relates to a skew detection system for an aircraft and, more particularly, to a skew detection system for determining a skew condition of a flight control surface of a wing.

BACKGROUND

Aircraft wings are typically provided with a number of moveable flight control surfaces such as slats and flaps. Specifically, an aircraft wing includes a leading edge as well as a trailing edge, where slats are moveably coupled to the leading edge of the wing and flaps are moveably coupled to the trailing edge of the wing. The flight control surfaces located on one of the wings of the aircraft may be arranged to move in unison with the respective flight control surfaces located on the opposite wing of the aircraft.

The flight control surfaces have a significant effect upon the aerodynamic performance of the wing. Accordingly, there are a number of flight control skew detection systems currently available that determine if one of more flight control surfaces of an aircraft wing are skewed. The flight control skew detection systems currently available determine a difference in motion between an intact and a non-functioning drive mechanism in order to detect a skew condition of the flight control surface. The current approach to detect a skew condition of the flight control surface may become problematic if the slats and flaps of the wing are constructed of a composite material, since composite materials are relatively stiff. Accordingly, even a relatively small deflection or change in motion in a composite material may become challenging to detect with the current motion sensors used. However, it should be appreciated that these relatively small deflections may still induce a relatively large load on the slat or flap of the wing. Thus, there exists a continuing need in the art for improved flight control skew detection systems that overcome the above-mentioned issues.

SUMMARY

In one aspect, a motionless skew detection system for an aircraft is disclosed, and includes a flight control surface of an aircraft wing, two drive mechanisms for operating the flight control surface, a first load sensor and a second load sensor for each of the two drive mechanisms, and a control module. Each of the two drive mechanisms are located on opposing sides of the flight control surface, and each of the two drive mechanisms include at least a first linkage including a first outer surface and a second linkage including a second outer surface. The first load sensor is disposed along the first outer surface of the first linkage and the second load sensor is disposed along the second outer surface of the second linkage. The control module is in signal communication with the first load sensor and the second load sensor. The control module includes control logic for monitoring a load detected by the first load sensor and the second load sensor of each drive mechanism. The control module includes control logic for determining a total load of each drive mechanism of the flight control surface based on the loads detected by the first load sensor and the second load sensor. The control module also includes control logic for determining a freewheeling skew of the flight control surface in response to the total load of one of the drive mechanisms of the flight control surface exceeding the total load of a remaining drive mechanism of the flight control surface by a predetermined margin.

In another aspect, skew detection system for an aircraft is disclosed and includes a flight control surface of an aircraft wing. The skew detection system also includes a drive mechanism including at least a first linkage including a first outer surface and a second linkage including a second outer surface for operating the flight control surface. The skew detection system also includes a first load sensor and a second load sensor for the drive mechanism. The first load sensor is disposed along the first outer surface of the first linkage and the second load sensor is disposed along the second outer surface of the second linkage. The skew detection system also includes a control module in signal communication with the first load sensor and the second load sensor. The control module includes control logic for monitoring a load detected by the first load sensor and the second load sensor of the drive mechanism of the flight control surface. The control module also includes control logic for determining a total load of the drive mechanism before the flight control surface is actuated based on the load detected by the first load sensor and the second load sensor. The control module also includes control logic for determining a total load of the drive mechanism after the flight control surface is actuated based on the load detected by the first load sensor and the second load sensor. Finally, the control module includes control logic for determining a skew condition of the flight control surface in response to the total load of the drive mechanism before the flight control surface is actuated exceeding the total load of the drive mechanism after the flight control surface is actuated by a threshold amount.

In still another aspect, a motionless method of determining a freewheeling skew of a flap of an aircraft wing is disclosed. The method comprising providing two drive mechanisms for operating the flap, where each of the two drive mechanisms are located on one of the opposing sides of the flap and each drive mechanism includes at least a first linkage including a first outer surface and a second linkage including a second outer surface. The method also includes monitoring a load detected by a first load sensor and a second load sensor of each drive mechanism by a control module in signal communication with the first load sensor and the second load sensor. The first load sensor is disposed along the first outer surface of the first linkage and the second load sensor is disposed along the second outer surface of the second linkage. The method also includes determining a total load of each drive mechanism of the flight control surface based on the loads detected by first load sensor and the second load sensor. The method also includes determining a freewheeling skew of the flight control surface in response to the total load of one of the drive mechanisms of the flight control surface exceeding the total load of a remaining drive mechanism of the flight control surface by a predetermined margin.

Other objects and advantages of the disclosed method and system will be apparent from the following description, the accompanying drawings and the appended claims.

DETAILED DESCRIPTION

Figure 1:
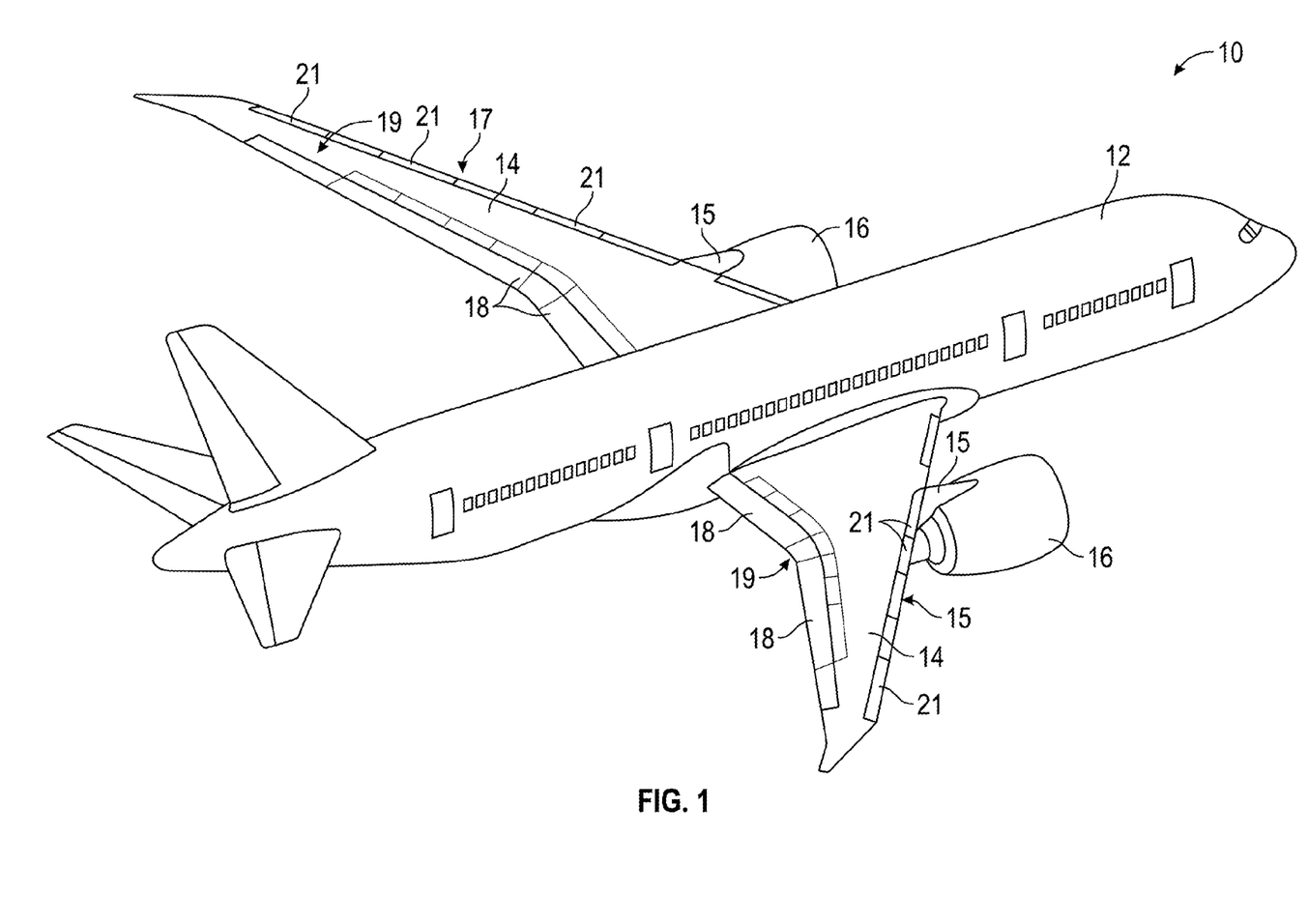
FIG. 1 is a perspective view of an aircraft incorporating flaps on trailing edges of its wings.
Figure 2:
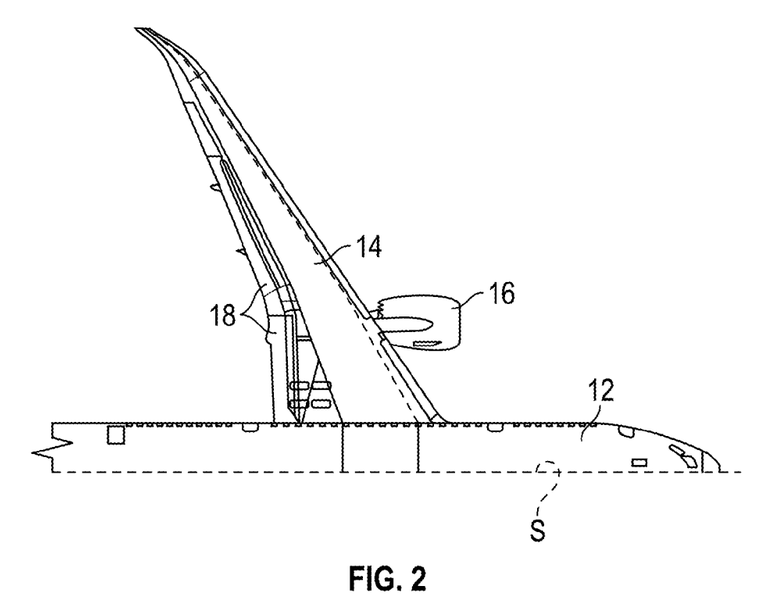
FIG. 2 is a partial top view of the aircraft shown in FIG. 1.

FIGS. 1 and 2 are perspective and partial top views of an aircraft 10 employing the disclosed skew detection system. The aircraft 10 may include a fuselage 12 having a pair of wings 14. Each wing 14 includes a respective jet engine 16. The jet engine 16 may be located below the respective wing 14, and is supported by a pylon 15. Each wing 14 also includes a leading edge 17 as well as a trailing edge 19. A pair of flaps 18 may be supported at the trailing edge 19 of the wing 14 by a pair of flap drive mechanisms 20 (shown in FIG. 3). The flaps 18 may be disposed symmetrically with respect to the sagittal plane S of the aircraft 10. During operation, the flaps 18 may be extended and retracted simultaneously with each other.

Figure 3:
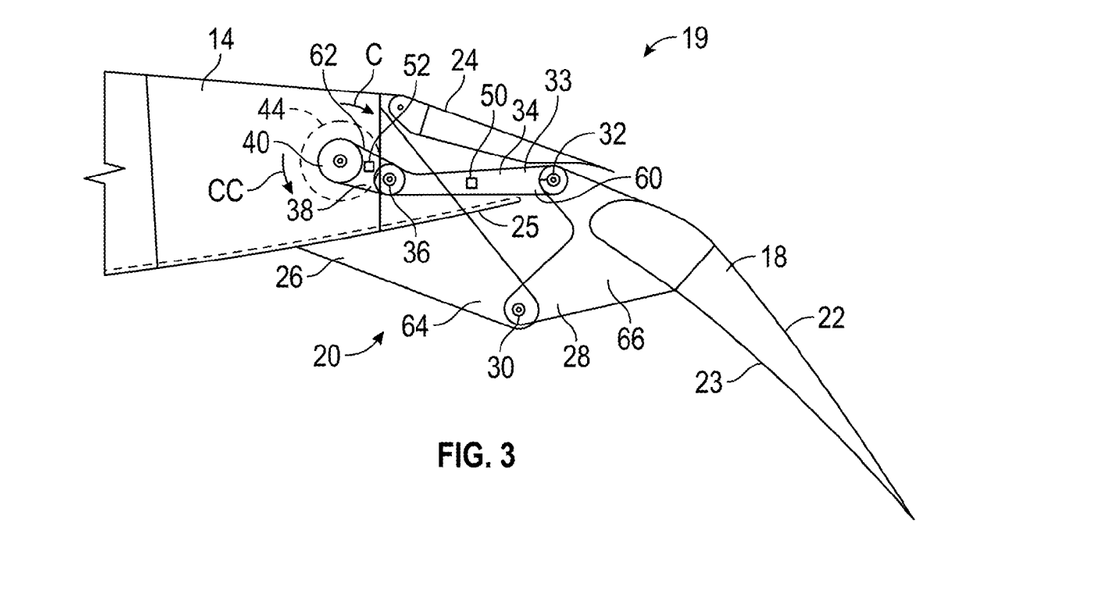
FIG. 3 is a partial cross-sectional view of one of the trailing edges of the wings, a single flap, and a flap drive mechanism for operating the flap.
Figure 4:
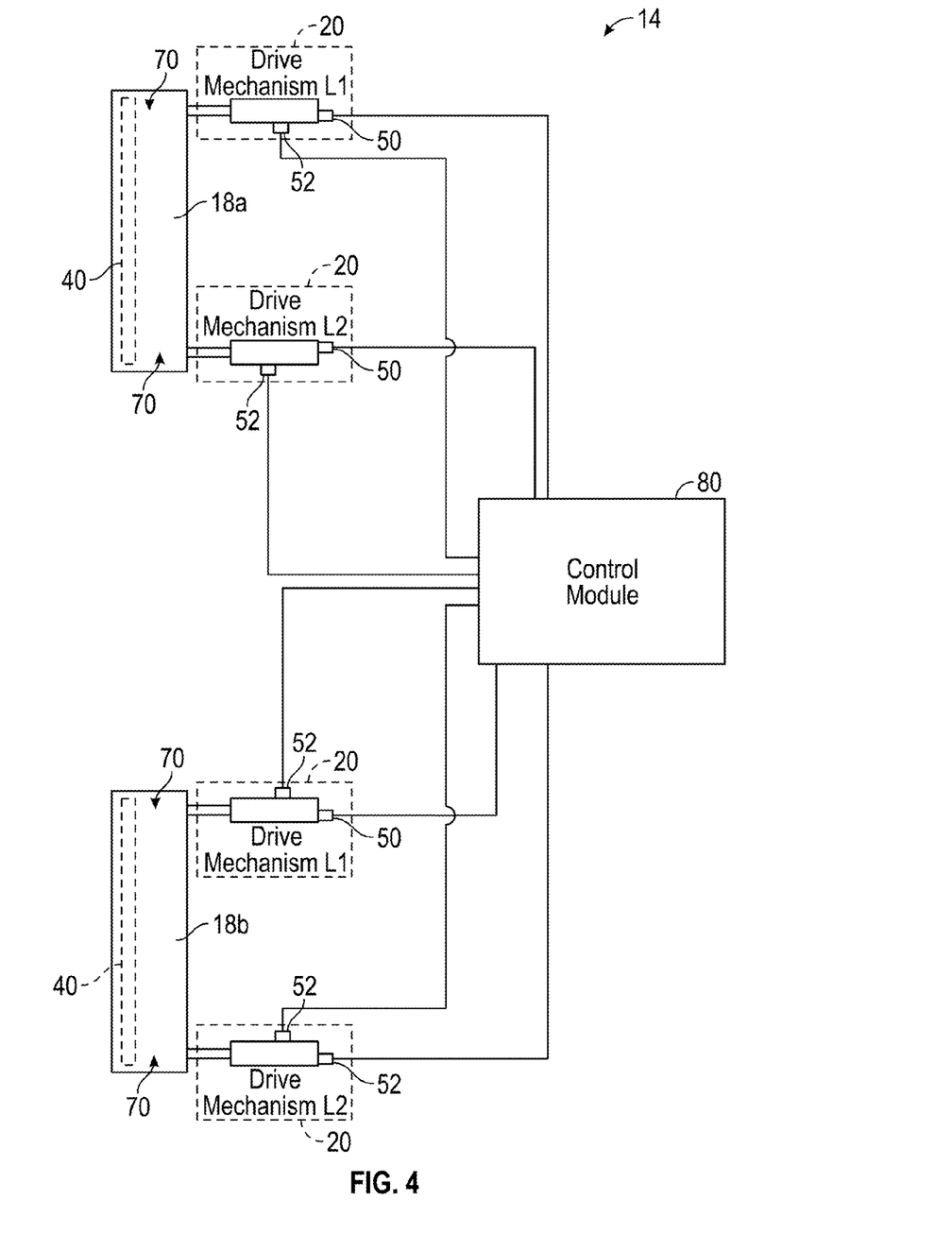
FIG. 4 is a schematic diagram illustrating the disclosed skew detection system.

FIG. 3 is a partial cross-sectional view of the trailing edge 19 of one of the wings 14 of the aircraft 10. FIG. 3 also illustrates a single flap drive mechanism 20 that may be used to operate the flap 18. As explained in greater detail below, the flap drive mechanism 20 may include a plurality of linkages that are actuated in order to either extend or retract the flap 18 disposed along the trailing edge 19 of the wing 14. As seen in FIG. 3, the flap 18 of the wing 14 may include a foil-shaped cross-sectional profile defining an upper surface 22 as well as a lower surface 23. The upper surface 22 of the flap 18 transitions into an upper surface 24 of the wing 14 and the lower surface 23 of the flap 18 transitions into a lower surface 25 of the wing 14 when the flap 18 is disposed into a fully retracted position (not illustrated in the figures). FIG. 4 is an illustration of two flaps 18a, 18b of one of the wings 14. Referring to FIG. 4, those of ordinary skill in the art will readily understand that each flap 18a, 18b of the wing 14 includes two flap drive mechanisms 20, where a single flap drive mechanism 20 is positioned on opposing sides 70 of the flap 18.

Turning back to FIG. 3, in one exemplary embodiment the flap drive mechanism 20 includes four linkages for extending and retracting the flap 18. The four linkages may include a first linkage or arm 26, a second linkage or arm 28, a third linkage or arm 34, and a fourth linkage or driving arm 38. The first arm 26 may be rigidly fixed or attached to the trailing edge 19 of the wing 14, and the second arm 28 may be rigidly fixed or attached to the flap 18. In the embodiment as shown in FIG. 3, the second arm 28 is generally V-shaped. The second arm 28 may include a lower end 30 as well as an upper end 32. The lower end 30 of the second arm 28 may be pivotally supported by the first arm 26, and the upper end 32 of the second arm 28 may be rotateably coupled to a first end 33 of the third arm 34. A second end 36 of the third arm 34 may be rotateably coupled to the driving arm 38. As seen in FIG. 3, the driving arm 38 may be fixedly connected to a shaft or torque tube 40.

As seen in FIG. 4, the torque tube 40 may extend in a direction that is substantially parallel with the flap 18. Turning back to FIG. 3, the torque tube 40 may be selectively rotated in either a clockwise C or a counterclockwise CC direction by an actuator 44. The actuator 44 may be hydraulic, pneumatic, or electrically powered. Those of ordinary skill in the art will readily appreciate that rotation of the torque tube 40 in the clockwise direction C will cause the flap 18 to retract toward the wing 14, and rotation of the torque tube 40 in the counterclockwise direction CC will cause the flap 18 to extend relative to the wing 14. Those of ordinary skill in the art will also appreciate that the illustration of the flap drive mechanisms 20 shown in FIG. 3 is merely exemplary in nature, and that the details of the flap drive mechanisms 20 may vary from the specific embodiment as shown in FIG. 3 depending on the type of aircraft.

Continuing to refer to FIG. 3, each flap drive mechanism 20 includes at least two load measurement sensors or load cells, which are illustrated as a first load sensor 50 and a second load sensor 52. As explained in greater detail below, the load sensors 50, may be used to detect a skew condition of the flap 18 of the wing 14. Each load sensor 50, 52 may be placed on a linkage of the flap drive mechanism 20 (i.e., the first arm 26, the second arm 28, the third arm 34, or the driving arm 38). The load sensors 50, 52 may be a device including one or more strain gauges (not illustrated) for converting a load experienced by a linkage of the flap drive mechanism 20 into electrical signals. The load sensors 50, 52 may be structured such that an applied force or a load experienced by one of the linkages of the flap drive mechanism 20 (i.e., the first arm 26, the second arm 28, the third arm 34, and the driving arm 38) deforms the strain gauges. The strain gauges may convert deformation experienced along an outer surface of an object (i.e., strain) into electrical signals. Those of ordinary skill in the art will readily appreciate that a load sensor usually includes four strain gauges arranged in a Wheatstone bridge configuration, however the disclosure should not be limited to this particular configuration. The strain gauges may be, for example, foil strain gauges, or fine wire mesh gauges. Alternatively, in another embodiment, the load sensors 50, 52 may be piezoelectric load cells.

In the non-limiting embodiment as shown in FIG. 3, the first load sensor 50 is placed along an outer surface 60 of the third arm 34, and the second load sensor 52 is placed along an outer surface 62 of driving arm 38. However, it is to be understood that the illustration shown in FIG. 3 is merely exemplary in nature. For example, in an alternative embodiment, the first load sensor 50 may be placed along an outer surface 64 of the first arm 26, and the second load sensor 52 may be placed along an outer surface 66 of the second arm 28. It is to be understood that the location of the load sensors 50, 52 may be mixed and matched between the first arm 26, the second arm 28, the third arm. 34, and the driving arm 38 of the flap drive mechanisms 20. Moreover, in another embodiment, three or even four load sensors may be used by the flap drive mechanism 20 as well.

FIG. 4 is schematic illustration of the flaps 18a, 18b of a left wing 14a of the aircraft 10. The flap 18a includes two flap drive mechanisms L1, L2, and the flap 18b also includes two drive mechanisms L1, L2. It is to be understood that while the present disclosure is directed towards detecting a skew condition of the flaps 18a, 18b, the skew detection system may also be used to detect a skew condition of other flight control surfaces of the wing 14 (FIG. 1) as well. Specifically, referring back to FIG. 1, in one embodiment the skew detection system may be used to detect a skew condition of slats 21 moveably coupled to the leading edge 17 of the wing 14. Those of ordinary skill in the art will readily appreciate that while the left wing 14a is illustrated in FIG. 4, a right wing 14b of the aircraft 10 (FIG. 5) is a mirror image of the left wing 14a, and the skew detection system may also be used to detect a skew condition of the right wing 14b as well.

Referring generally to FIGS. 1, 3 and 4, the disclosed skew detection system may be used to detect a variety of skew conditions, and is described in greater detail below. For example, in one embodiment the skew detection system may be used to detect a freewheeling skew, where one side 70 of a flap 18a or 18b (FIG. 4) disconnects at one of the respective linkages of the flap drive mechanism 20 (i.e., the first arm 26, the second arm 28, the third arm 34, or the driving arm 38). The disclosed skew detection system may also be used to detect a power skew as well. During a power skew, the flap drive mechanism 20 disconnects from the torque tube 40 (FIG. 3).

Referring to FIG. 4, each flap 18a, 18b includes two flap drive mechanisms L1, L2 located on opposing sides 70 of the respective flap 18a, 18b. Both the load sensors 50, 52 of each flap drive mechanism L1, L2 may be in signal communication with a control module 80 that is part of the skew detection system. The control module 80 may refer to, or be part of, an application specific integrated circuit (ASIC), an electronic circuit, a combinational logic circuit, a field programmable gate array (FPGA), a processor (shared, dedicated, or group) comprising hardware or software that executes code, or a combination of some or all of the above, such as in a system-on-chip.

In one embodiment, the control module 80 may be used to determine a freewheeling skew of one of the flaps 18a, 18b using a motionless approach. Specifically, the control module 80 includes control logic for monitoring the first load sensor 50 as well as the second load sensor 52 of each flap drive mechanism L1, L2 of the flap 18a, as well as monitoring the first load sensor 50 as well as the second load sensor 52 of each flap drive mechanism L1, L2 of the flap 18b. The control module 80 further includes control logic for then combining the loads detected by both the first load sensor 50 as well as the second load sensor 52 together to determine a total load of a specific flap drive mechanism 20. For example, the control module 80 includes control logic for adding the load detected by the first load sensor 50 and the load detected by the second load sensor 52 for the flap drive mechanism L1 of the flap 18a together in order to determine a total load of the flap drive mechanism L1 of the flap 18a.

In the event more than two load sensors are used for each flap drive mechanism 20 then the load detected by each load sensor is added together to determine the total load of the flap drive mechanism 20. For example, if the flap drive mechanism 20 includes four load sensors; then the total load is determined by adding the loads detected by each load sensor together.

Figure 5:
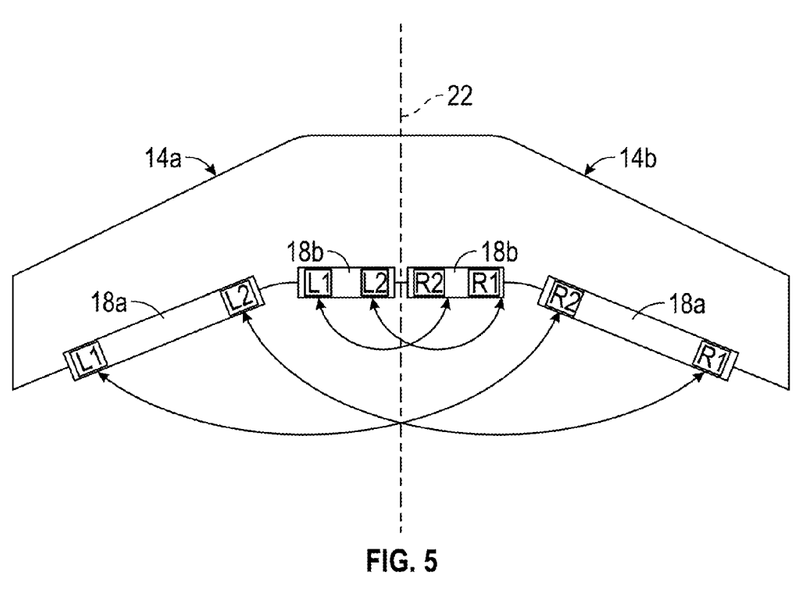
FIG. 5 is an illustration of the left wing as well as the right wing of the aircraft shown in FIG. 1.

The control module 80 also includes control logic for comparing the total load of a specific flap drive mechanism 20 (i.e., the flap drive mechanism L1 of the flap 18a) with the total load of an opposing flap drive mechanism 20 located along the opposite side 70 of the flap 18a (i.e., the flap drive mechanism L2 of the flap 18a). It is to be understood that the comparison between flap drive mechanisms L1, L2 may be made across the left and right wings 14a, 14b of the aircraft 10 (FIG. 1) as well. Specifically, FIG. 5 illustrates the left wing 14a and the right wing 14b of the aircraft 10. The left wing 14a includes two flaps 18a, 18b, and each flap 18a, 18b may include two flap drive mechanisms L1, L2. Similarly, the right wing 14b includes two flaps 18a, 18b, and each flap 18a, 18b may include two flap drive mechanisms R1, R2. As seen in FIG. 5, the flap drive mechanisms L1, L2 of the left wing 14a may be compared with the opposing flap drive mechanisms R1, R2 of the right wing 14b. For example, the control module 80 (FIG. 4) may compare the flap drive mechanism L1 of the flap 18a of the left wing 14a with the flap drive mechanism R2 of the flap 18a of the right wing 14b.

Turning back to FIG. 4, the control module 80 also includes control logic for determining if the total load of the specific flap drive mechanism L1 is greater than the opposing flap drive mechanism L2 by a predetermined margin. The predetermined margin indicates an imbalanced or asymmetric load between the two flap drive mechanisms 20 experienced during a freewheeling skew. For example, in one embodiment, the flap drive mechanism L1 may experience about two thirds of the load required to actuate the flap 18a, and the remaining flap drive L2 of the flap 18a may experience about one third of the load required to actuate the flap 18a. Thus, if the control module 80 determines that the flap drive mechanism L1 is actually carrying ninety percent of the load required to actuate the flap 18a, this indicates there is an asymmetric load between the two flap drive mechanisms L1, L2.

Once the control module 80 determines if the asymmetric load between the two flap drive mechanisms L1, L2, the control module 80 may continue to monitor the load sensors 50, 52 of each flap drive mechanisms L1, L2 for a predetermined amount of time. In one embodiment, the predetermined amount of time may range from about 0.25 to about twenty seconds. If the asymmetric load condition continues to persist after the predetermined amount of time, then the control module 80 determines a freewheeling skew of one of the flaps 18a, 18b has occurred. In other words, the control module 80 determines a freewheeling skew of one of the flaps 18a, 18b in response to the total load of one of the flap drive mechanisms L1 exceeding the total load of a remaining flap drive mechanism L2 by the predetermined margin.

In one embodiment, the control module 80 may include control logic for generating a signal that triggers an alarm or other indicator within the aircraft 10 (FIG. 1) to warn a pilot of the freewheeling skew condition. Additionally or alternatively, the control module 80 may include control logic for disabling the flap drive mechanisms L1, L2 of the specific flap 18a, 18b experiencing the freewheeling skew.

Figure 6:
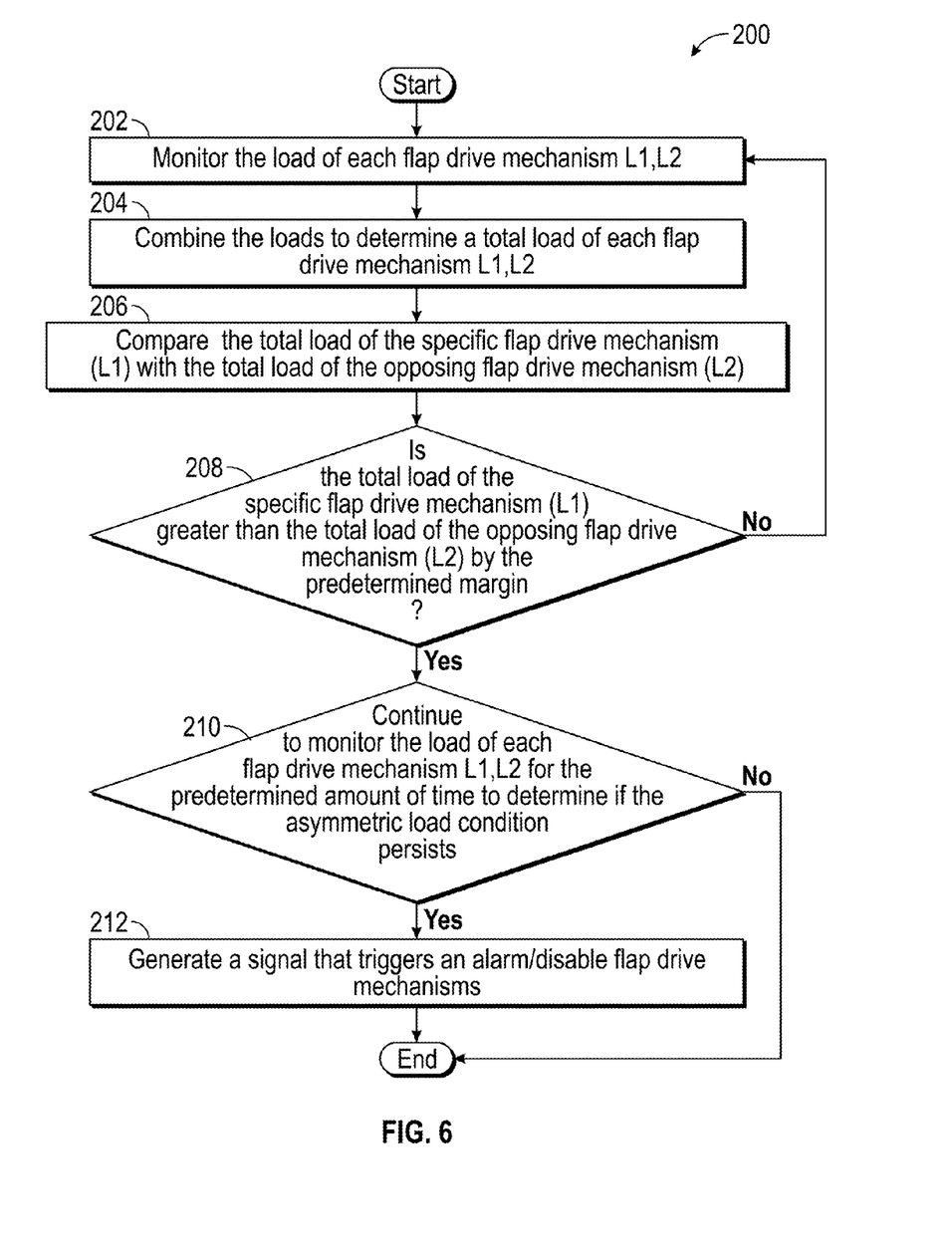
FIG. 6 is an exemplary process flow diagram illustrating a method for determining a freewheeling skew condition of the flaps of the aircraft.

FIG. 6 is an exemplary process flow diagram of a method 200 for determining a freewheeling skew of the flap 18a of the aircraft 10. Those of ordinary skill in the art will readily appreciate that while the flap 18a is discussed in method 200, a similar approach may be used to determine a freewheeling skew of the flap 18b as well. Referring generally to FIGS. 1-6, method 200 may begin at block 202. In block 202, the control module 80 includes control logic for monitoring the first load sensor 50 as well as the second load sensor 52 of each flap drive mechanism L1, L2 of the flap 18a. Method 200 may then proceed to block 204.

In block 204, the control module 80 includes control logic for combining the loads detected by both the first load sensor 50 as well as the second load sensor 52 together to determine a total load of each flap drive mechanism L1, L2 of the flap 18a. Method 200 may then proceed to block 206.

In block 206, the control module 80 compares the total load of a specific flap drive mechanism L1 with the total load of the opposing flap drive mechanism L2 of the flap 18a. Method 200 may then proceed to block 208.

In block 208, the control module 80 determines if the total load of a specific flap drive mechanism L1 is greater than the opposing flap drive mechanism L2 of the flap 18a by the predetermined margin. If the total load of the specific flap drive mechanism L1 is not greater than the opposing flap drive mechanism L2 by the predetermined margin, then method 200 may proceed back to block 202. However, if the total load of the specific flap drive mechanism L1 is greater than the opposing flap drive mechanism L2 by the predetermined margin, then method 200 may proceed to block 210.

In block 210, the control module 80 continues to monitor the load sensors 50, 52 of each flap drive mechanism L1, L2 of the flap 18a for the predetermined amount of time. If the asymmetric load condition does not persist after the predetermined amount of time, then the control module 80 determines no freewheeling skew of the flap 18a has occurred. Thus, method 200 may then terminate, or proceed back to block 202. However, if the asymmetric load condition continues to persist after the predetermined amount of time, then the control module 80 determines a freewheeling skew of the flaps 18a has occurred. Method 200 may then proceed to block 212.

In block 212, the control module 80 may generate a signal that triggers an alarm or other indicator within the aircraft 10 (FIG. 1) to warn a pilot of the freewheeling skew condition. Additionally or alternatively, the control module 80 may include control logic for disabling one or more of the flap drive mechanisms L1, L2 of the flap 18a experiencing the freewheeling skew. Method 200 may then terminate.

Referring generally to FIGS. 1-6, the disclosed skew detection system may be used to detect a freewheeling skew in the aircraft. The skew detection systems that are currently available detect a skew condition of a flight control surface based on a difference in motion between an intact and a non-functioning drive mechanism. In contrast, the disclosed skew detection system as described in FIGS. 1-6 relies on a difference in load between the two flap drive mechanisms of a flap. In other words, the disclosed load sensors may reduce or eliminate the need for comparing a difference in motion between an intact and a non-functioning drive mechanism in order to detect a skew condition. Accordingly, the disclosed skew detection system may reduce the structural weight of an aircraft since the flaps of the aircraft no longer need to be able to sustain high loads induced by differential motion during a skew condition.

Turning back to FIG. 4, in an alternative embodiment the control module 80 may be used to determine a power or a freewheeling skew of one of the flaps 18a, 18b based on motion of the flaps 18a, 18b before and after the flaps 18a, 18b are actuated. In other words, the control module 80 may be used to determine a power or a freewheeling skew of one of the flaps 18a, 18b after the flaps 18a, 18b are either extended or retracted. As explained above, the control module 80 includes control logic for monitoring the first load sensor 50 as well as the second load sensor 52 of each flap drive mechanism L1, L2 for the flaps 18a, 18b. The control module 80 further includes control logic for then combining the loads detected by both the first load sensor 50 as well as the second load sensor 52 together to determine the total load of a specific flap drive mechanism L1, L2.

The control module 80 also includes control logic for monitoring the total load of each flap drive mechanism L1, L2 of the flaps 18a, 18b before the flaps 18a, 18b are actuated (i.e., before the flaps 18a, 18b are either extended or retracted). The control module 80 also includes control logic for monitoring the total load of each flap drive mechanism 20 of the flaps 18a, 18b after the flaps 18a, 18b are actuated (i.e., after the flaps 18a, 18b are either extended or retracted). The control module 80 includes control logic for comparing the total load of a specific flap drive mechanism 20 before actuation with the total load of the same flap drive mechanism 20 after actuation, and determining a difference between the two total loads (i.e., the same flap drive mechanism 20 is compared before and after actuation). The control module 80 further includes control logic for determining if the difference between the total load before and after actuation of the specific flap drive mechanism 20 is less than a threshold amount $\Psi$.

The threshold amount $\Psi$ represents an expected change in load of one of the flap drive mechanisms 20 before actuation and after actuation of the flaps 18a, 18b during normal operation (i.e., no skew condition). In one embodiment, the threshold amount $\Psi$ may range from about 20 percent to about 50 percent. Those of ordinary skill in the art will readily appreciate that the load at each flap drive mechanism 20 before motion is commanded is merely the airload experienced at the specific flap drive mechanism 20. After motion is commanded, the load at each flap drive mechanism 20 is now the airload plus an actuation load.

If the control module 80 determines the difference between the total load the specific flap drive mechanism 20 before actuation and the load of the specific flap drive mechanism 20 after actuation is greater than the threshold amount $\Psi$, then the control module 80 determines a potential skew condition of the specific flap drive mechanism 20. Once the control module 80 determines the potential skew condition, the control module 80 may continue to monitor the load sensors 50, 52 of the specific flap drive mechanism 20 for the predetermined amount of time. If the difference in total load before actuation of the specific flap drive mechanism 20 and after actuation of the specific flap drive mechanism 20 continues to exceed the threshold amount $\Psi$ after the predetermined amount of time has lapsed, then the control module 80 determines a skew condition of one of the flaps 18a, 18b has occurred. Specifically, the skew condition may be either a freewheeling skew or a power skew.

In one embodiment, the control module 80 may include control logic for generating a signal that triggers an alarm or other indicator within the aircraft 10 (FIG. 1) to warn a pilot of the skew condition. Additionally or alternatively, the control module 80 may include control logic for disabling the flap drive mechanism 20 of the flap 18 experiencing the skew condition.

Figure 7:
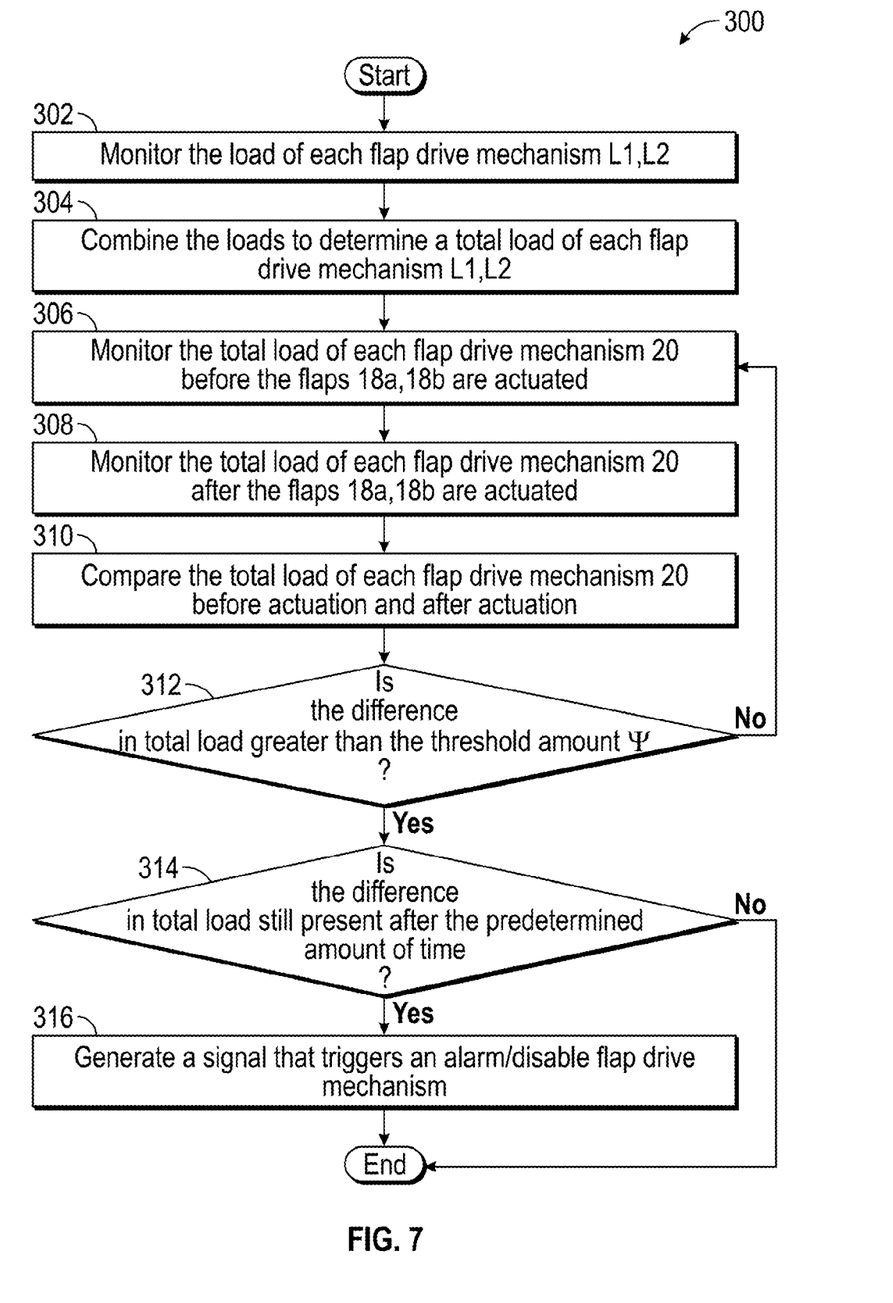
FIG. 7 is an exemplary process flow diagram illustrating an alternative method for determining either a freewheeling or a power skew condition of the flaps of the aircraft.

FIG. 7 is an exemplary process flow diagram for illustrating a method 300 for determining a skew condition of one or more of the flaps 18a, 18b (FIG. 4). Referring generally to FIGS. 1-5 and 7, method 300 may begin at block 302. In block 302, the control module 80 includes control logic for monitoring the first load sensor 50 as well as the second load sensor 52 of each flap drive mechanism L1, L2 of the flap 18a, as well as monitoring the first load sensor 50 as well as the second load sensor 52 of each flap drive mechanism L1, L2 of the flap 18b. Method 300 may then proceed to block 304.

In block 304, the control module 80 includes control logic for combining the loads detected by both the first load sensor 50 as well as the second load sensor 52 together to determine a total load of each flap drive mechanism L1, L2 of each flap 18a, 18b. Method 300 may then proceed to block 306.

In block 306, the control module 80 monitors the total load of each flap drive mechanism 20 of the flaps 18a, 18b before the flaps 18a, 18b are actuated (i.e., before the flaps 18a, 18b are either extended or retracted). Method 300 may then proceed to block 308.

In block 308, the control module 80 monitors the total load of each flap drive mechanism 20 of the flaps 18a, 18b after the flaps 18a, 18b are actuated (i.e., after the flaps 18a, 18b are either extended or retracted). Method 300 may then proceed to block 310.

In block 310, the control module 80 compares the total load of a specific flap drive mechanism 20 before actuation with the total load of the same flap drive mechanism 20 after actuation, and determines a difference between the two total loads. Method 300 may then proceed to block 312.

In block 312, the control module 80 determines if the difference between the total load the specific flap drive mechanism 20 before actuation and the load of the specific flap drive mechanism 20 after actuation is greater than the threshold amount $\Psi$. If the difference between the two total loads is less than the threshold amount $\Psi$, method 300 may return to block 306. However, if the difference between the two total loads is greater than the threshold amount $\Psi$, then method 300 may proceed to block 314.

In block 314, the control module 80 may continue to monitor the load sensors 50, 52 of the specific flap drive mechanism 20 for the predetermined amount of time. If the difference in load before actuation of the specific flap drive mechanism 20 and after actuation of the specific flap drive mechanism 20 does not exceed the threshold amount $\Psi$ after the predetermined amount of time has lapsed, then the control module 80 determines no skew condition has occurred. Method 300 may then terminate, or return to block 302. However, if the difference in load before actuation of the specific flap drive mechanism 20 and after actuation of the specific flap drive mechanism 20 continues to exceed the threshold amount $\Psi$ after the predetermined amount of time has lapsed, then the control module 80 determines a skew condition of the flaps 18a has occurred. Method 300 may then proceed to block 316.

In block 316, the control module 80 may generate a signal that triggers an alarm or other indicator within the aircraft 10 (FIG. 1) to warn a pilot of the skew condition. Additionally or alternatively, the control module 80 may include control logic for disabling the flap drive mechanisms 20 of the specific flap 18a, 18b experiencing the skew condition. Method 300 may then terminate.

While the forms of apparatus and methods herein described constitute preferred aspects of this disclosure, it is to be understood that the disclosure is not limited to these precise forms of apparatus and methods, and the changes may be made therein without departing from the scope of the disclosure.

What is claimed is:

1. A motionless skew detection system for an aircraft, comprising:
    a left wing and a right wing, wherein the left wing defines a left flight control surface and the right wing defines a right flight control surface, and wherein the left flight control surface and the right flight control surface both have opposing sides;
    a left drive mechanism disposed on a selected side of the left flight control surface and a right drive mechanism disposed on a remaining side of the right flight control surface that is opposite to the selected side of the right flight control surface, and wherein both the left drive mechanism and the right drive mechanism include at least a first linkage including a first outer surface and a second linkage including a second outer surface;
    a first load sensor and a second load sensor for both the left drive mechanism and the right drive mechanisms, wherein the first load sensor is disposed along the first outer surface of the first linkage and the second load sensor is disposed along the second outer surface of the second linkage; and
    a control module in signal communication with the first load sensor and the second load sensor of both the left drive mechanism and the right drive mechanism, the control module including control logic for:
        monitoring a left load detected by the first load sensor and the second load sensor of the left drive mechanism, and determining a total load for the left drive mechanism based on the load detected by first load sensor and the second load sensor of the left drive mechanism;
        monitoring a right load detected by the first load sensor and the second load sensor of the right drive mechanism, and determining a total load for the right drive mechanism based on a load detected by first load sensor and the second load sensor of the left drive mechanism; and
        determining a freewheeling skew of either the left flight control surface or the right flight control surface in response to the total load of one of the left drive mechanism and the right drive mechanism exceeding the total load of a remaining one of the left drive mechanism and the right drive mechanism by a predetermined margin.

2. The skew detection system of claim 1, wherein the predetermined margin indicates an asymmetric load between the left drive mechanism and the right drive mechanism.

3. The skew detection system of claim 1, comprising a third linkage and a third load sensor for both the left drive mechanism and the right drive mechanism, wherein the third load sensor is disposed along a third outer surface of the third linkage and is in signal communication with the control module.

4. The skew detection system of claim 3, comprising a fourth linkage and a fourth load sensor for both the left drive mechanism and the right drive mechanism, wherein the fourth load sensor is disposed along a fourth outer surface of the fourth linkage and is in signal communication with the control module.

5. The skew detection system of claim 1, wherein the first load sensor and the second load sensor of both the left drive mechanism and the right drive mechanism each comprise of a plurality of strain gauges.

6. The skew detection system of claim 1, wherein the left flight control surface is a flap of the left wing and the right flight control surface is a flap of the right wing.

7. The skew detection system of claim 1, wherein the first linkage is selected from the group consisting of: a first arm, a second arm, a third arm, and a driving arm of either the left drive mechanism or the right drive mechanism.

8. The skew detection system of claim 1, wherein the second linkage is selected from the group consisting of: a first arm, a second arm, a third arm, and a driving arm of either the left drive mechanism or the right drive mechanism.

9. A skew detection system for an aircraft, comprising:
a flight control surface of an aircraft wing;
a drive mechanism including at least a first linkage including a first outer surface and a second linkage including a second outer surface for operating the flight control surface;
a first load sensor and a second load sensor of the drive mechanism, wherein the first load sensor is disposed along the first outer surface of the first linkage and the second load sensor is disposed along the second outer surface of the second linkage; and
a control module in signal communication with the first load sensor and the second load sensor, the control module including control logic for:
monitoring a load detected by the first load sensor and the second load sensor of the drive mechanism;
determining a total load of the drive mechanism before the flight control surface is actuated based on the load detected by the first load sensor and the second load sensor;
determining a total load of the drive mechanism after the flight control surface is actuated based on the load detected by the first load sensor and the second load sensor; and
determining a skew condition of the flight control surface in response to the total load of the drive mechanism before the flight control surface is actuated exceeding the total load of the drive mechanism after the flight control surface is actuated by a threshold amount.

10. The skew detection system of claim 9, wherein the threshold amount represents an expected change in load of the flight control surface before actuation and after actuation.

11. The skew detection system of claim 9, comprising a third linkage and a third load sensor, wherein the third load sensor is disposed along a third outer surface of the third linkage and is in signal communication with the control module.

12. The skew detection system of claim 11, comprising a fourth linkage and a fourth load sensor, wherein the fourth load sensor is disposed along a fourth outer surface of the fourth linkage and is in signal communication with the control module.

13. The skew detection system of claim 9, wherein the first load sensor and the second load sensor each comprise of a plurality of strain gauges.

14. The skew detection system of claim 9, wherein the flight control surface is a flap of the aircraft wing.

15. The skew detection system of claim 9, wherein the skew condition of the flight control surface is one of a power skew and a freewheeling skew.

16. A motionless method of determining a freewheeling skew of a flap of an aircraft wing, the method comprising:
providing a left wing and a right wing, wherein left first wing defines a left flight control surface and the right wing defines a right flight control surface, and wherein the left flight control surface and the right flight control surface both have opposing sides;
providing a left drive mechanism disposed on a selected side of the left flight control surface and a right drive mechanism disposed on a remaining side of the right flight control surface that is opposite to the selected side of the right flight control surface, wherein each of the left drive mechanism and the right drive mechanism include at least a first linkage including a first outer surface and a second linkage including a second outer surface, and wherein a first load sensor is disposed along the first outer surface of the first linkage and a second load sensor is disposed along the second outer surface of the second linkage of both the left drive mechanism and the right drive mechanism;
monitoring a left load detected by a first load sensor and a second load sensor of the left drive mechanism by a control module, wherein the first load sensor is disposed along the first outer surface of the first linkage and the second load sensor is disposed along the second outer surface of the second linkage of the left drive mechanism;
monitoring a right load detected by a first load sensor and a second load sensor of the right drive mechanism, and determining a total load for the right drive mechanism based on a load detected by first load sensor and the second load sensor of the left drive mechanism;
determining a total load of each of the left drive mechanism and the right drive mechanism based on the loads detected by first load sensor and the second load sensor of both the left drive mechanism and the right drive mechanism; and
determining a freewheeling skew of the flap in response to the total load of one of the left drive mechanism and the right drive mechanism exceeding the total load of a remaining one of the left drive mechanism and the right drive mechanism of the flap by a predetermined margin.

17. The method of claim 16, wherein the predetermined margin indicates an asymmetric load between the left drive mechanism and the right drive mechanism.

18. The method of claim 16, wherein the first load sensor and the second load sensor of both the left drive mechanism and the right drive mechanism each comprise of a plurality of strain gauges.

19. The method of claim 16, comprising selecting the first linkage from the group consisting of: a first arm, a second arm, a third arm, and a driving arm of either the left drive mechanism or the right drive mechanism.

20. The method of claim 16, comprising selecting the second linkage from the group consisting of: a first arm, a second arm, a third arm, and a driving arm of either the left drive mechanism or the right drive mechanism.

* * * * *